US007856602B2

(12) United States Patent
Armstrong

(10) Patent No.: US 7,856,602 B2
(45) Date of Patent: Dec. 21, 2010

(54) UPDATABLE MENU ITEMS

(75) Inventor: Kevin Neal Armstrong, San Jose, CA (US)

(73) Assignee: Apple Inc., Cupertino, CA (US)

( * ) Notice: Subject to any disclaimer, the term of this patent is extended or adjusted under 35 U.S.C. 154(b) by 457 days.

(21) Appl. No.: 11/111,177

(22) Filed: Apr. 20, 2005

(65) Prior Publication Data

US 2006/0242596 A1 Oct. 26, 2006

(51) Int. Cl.
G06F 3/048 (2006.01)
(52) U.S. Cl. .................... 715/830; 715/774
(58) Field of Classification Search .......... 715/774, 715/830
See application file for complete search history.

(56) References Cited

U.S. PATENT DOCUMENTS

| 5,771,032 | A | * | 6/1998 | Cline et al. | 715/786 |
| 6,154,757 | A | * | 11/2000 | Krause et al. | 715/530 |
| 6,262,724 | B1 | | 7/2001 | Crow et al. | |
| 6,721,953 | B1 | * | 4/2004 | Bates et al. | 725/39 |
| 6,753,892 | B2 | * | 6/2004 | Chung | 715/810 |
| 7,082,567 | B1 | * | 7/2006 | Young et al. | 715/501.1 |
| 2002/0063738 | A1 | * | 5/2002 | Chung | 345/810 |
| 2002/0120653 | A1 | * | 8/2002 | Kraft et al. | 707/529 |
| 2003/0137534 | A1 | * | 7/2003 | Hong | 345/738 |
| 2005/0144560 | A1 | * | 6/2005 | Gruen et al. | 715/711 |
| 2005/0223338 | A1 | * | 10/2005 | Partanen | 715/821 |
| 2007/0209018 | A1 | * | 9/2007 | Lindemann | 715/784 |

OTHER PUBLICATIONS

Author Unknown, Milonic web page, milonic.com/mfa/2003-January/001647.html, Jan. 28, 2003, 1 page total.
Author Unknown, JavaScript Examples—Change Button Text On MouseOver—web page, js-examples.com/javascript/?run=22, Apr., 2000, 2 pages total.
Author Unknown, Apple Human Interface Guidelines, Oct. 18, 2003, pp. 1-2, 129-153 (27 pages total), Apple Computer, Inc., United States of America.

* cited by examiner

Primary Examiner—William L Bashore
Assistant Examiner—Ashraf Zahr
(74) Attorney, Agent, or Firm—Blakely, Sokoloff, Taylor & Zafman LLP

(57) ABSTRACT

A menu is displayed within a graphical user interface. The menu of one exemplary embodiment includes a plurality of selectable menu items within the menu. One of the menu items includes a first region and a second region. The first region presents a static title for the menu item, and the second region includes text that is capable of scrolling. The text within the second region of the first menu item is scrolled in response to the first menu item being selected. For example, the selection may be made by hovering a pointer above the first menu item. The scrolling may then be paused when the pointer is moved away from above the first menu item.

32 Claims, 8 Drawing Sheets

UPDATABLE MENU ITEMS

TECHNICAL FIELD

This disclosure relates generally to user interfaces for digital processing systems, and in particular, relates to a graphical user interface with updatable menu items.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2005, Apple Computer, Inc., All Rights Reserved.

BACKGROUND INFORMATION

Graphical User Interfaces (GUIs) provide computer system users with a visual and intuitive means for interacting with the computer system. One common type of GUI element is the menu. Menus present lists of items—such as commands, attributes, or states—from which a user can choose. There are various forms of menus, such as pull-down menus, pop-up menus, and contextual menus. FIG. 1 illustrates an example of a prior art pull-down menu 102. A pull-down menu is a type of menu that typically appears directly beneath a selected object. Examples of pull-down menus are described in U.S. Pat. Nos. 4,464,652 and 4,931,783. Pull-down menus are typically accessed via a menu bar 106, which may be a menu bar for an entire display or a menu bar for a window where several windows may have their own menu bars. A menu bar is typically a horizontally oriented menu, but can also be vertically or otherwise linearly oriented. Each menu option (or menu title) in the menu bar is generally associated with its own respective pull-down menu that appears when the associated menu title is selected. A menu bar 106 typically includes a plurality of menu titles (e.g. 104,105), one for each menu accessible from the menu bar 106. In the example illustrated, the pull-down menu 102 is displayed in response to a user having selected a menu title 104 ("Finder") from the menu bar 106 to access the menu 102. The menu 102 includes a plurality of menu items 108, 112. Menu item 112 typically only includes one line of text, referred to as the menu item title. Each menu item may represent a command, attribute or state that may be invoked upon the selection and activation or initiation of the corresponding menu item. For example, if a user desired to delete files within the Trash (a folder of files designated for deletion), the user would choose the menu item 112 corresponding to the "Empty Trash" command. Thus, in the example illustrated by FIG. 1, the menu item title 113 for menu item 112 is "Empty Trash . . . ".

The menu item 112 is illustrated as being highlighted to indicate its status as being currently selected. Thus, as a user navigates through the items in the menu 102, each item is highlighted as it is respectively selected. A highlighted menu item, such as item 112 in FIG. 1, typically only indicates the currently selected item, and does not necessarily indicate that a command associated with the selected item has been activated (i.e. an additional command, such as clicking the item with a mouse or pressing the Enter key, is necessary to execute the action of the menu item). Some menu items, such as menu item 114, appear dimmed (gray) with respect to the other menu items 108, 112, to indicate that the menu item 114 is not available for selection. When certain conditions of the system change, the item 114 may become available for activation, and thus would appear enabled.

Menu items displayed within menus, such as items 108 and 112, are generally static objects; other than perhaps becoming highlighted when selected, or dimmed when unavailable, the text, icons or content presented within the menu items generally does not change while the menu is being displayed. One exception exists in some computing systems, in which commands or items displayed within a menu change when the user presses a modifier key while viewing the menu; such items are referred to as dynamic menu items. However, to view these dynamic menu items, a user is required to perform an additional step (i.e. pressing a modifier key). Further, the different set of menu items available when the modifier key is pressed are nonetheless a predetermined set of menu items, which once displayed, remain static. Additionally, some menus include toggled menu items, which change between two states each time a user chooses it, such a checkmark adjacent to a menu item to indicate a current state of an object associated with the menu item (e.g. active or inactive). Thus, for the most part, menus and the items within them typically represent static objects presenting predetermined information.

Further, to conserve screen space and to minimize screen clutter, many menu items such as menu item 112 consist of short textual descriptions or icons. While these short descriptions are often satisfactory for clearly conveying the commands that may be invoked upon selection of these menu items, the limited space available within the menu 102 may make it difficult to convey more detailed information associated with a menu item. Scrolling text within a window or portion of a window has provided more information to a user than would be allowed if only static text were displayed in the window or portion of the window. See for example, U.S. Pat. No. 6,262,724.

SUMMARY OF THE DESCRIPTION

The present invention relates to updatable menu items within a graphical user interface. Embodiments of the present invention relate to updatable menu items within a graphical user interface (GUI). In one embodiment, as a user selects menu items from within a menu, such as, for example a pull-down menu or a pop-up menu or a contextual menu, secondary text (text apart from the title of the menu item) associated with the selected menu item scrolls to present useful information pertaining to the selected menu item. Thus, a user may quickly be presented with essential information for a menu item, without having to actually initiate a command associated with the menu item. In one embodiment, the content of the secondary text is generated in real time, and is not merely a presentation of predetermined information, and this secondary text is displayed within the same GUI region which is used to activate the menu item.

In one aspect, a menu is displayed within a graphical user interface. The menu includes a plurality of selectable menu items within the menu. A first menu item includes a first region and a second region, the first region presenting a static title for the menu item, and the second region including text that is capable of scrolling. The text within the second region of the first menu item is scrolled. In one aspect, the scrolling is in response to the receiving the selection of the first menu item. The selection may be made by hovering a pointer above the first menu item. The scrolling may then be paused when the pointer is moved from above the first menu item.

In another aspect, a menu is presented within a graphical user interface. A menu item within the menu includes a first line of text and a second line of text, the first line of text being static, and the second line of text capable of scrolling. In response to receiving a selection of the item within the menu, text within the selected menu item begins to scroll. The content of the second line of text may be generated in real-time for display.

In yet another aspect, a menu within a graphical user interface includes a plurality of selectable menu items, wherein a first menu item includes a first line of text and a second line of text. The second line of text is automatically animated upon displaying the menu. The animating may include scrolling the second line of text, such as, for example, horizontal scrolling.

In another aspect of the invention, an object within a graphical user interface includes a plurality of selectable items. Each item includes a static region and an updatable region. Upon receiving a selection of a first selectable item within the object, text within the selected first item scrolls. The object may be either a menu or a table. In one aspect, the selection is made by hovering a pointer above the first item for a predetermined period of time.

The present invention is described in conjunction with systems, clients, servers, methods, and machine-readable media of varying scope. In addition to the aspects of the present invention described in this summary, further aspects of the invention will become apparent by reference to the drawings and by reading the detailed description that follows.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 2A:
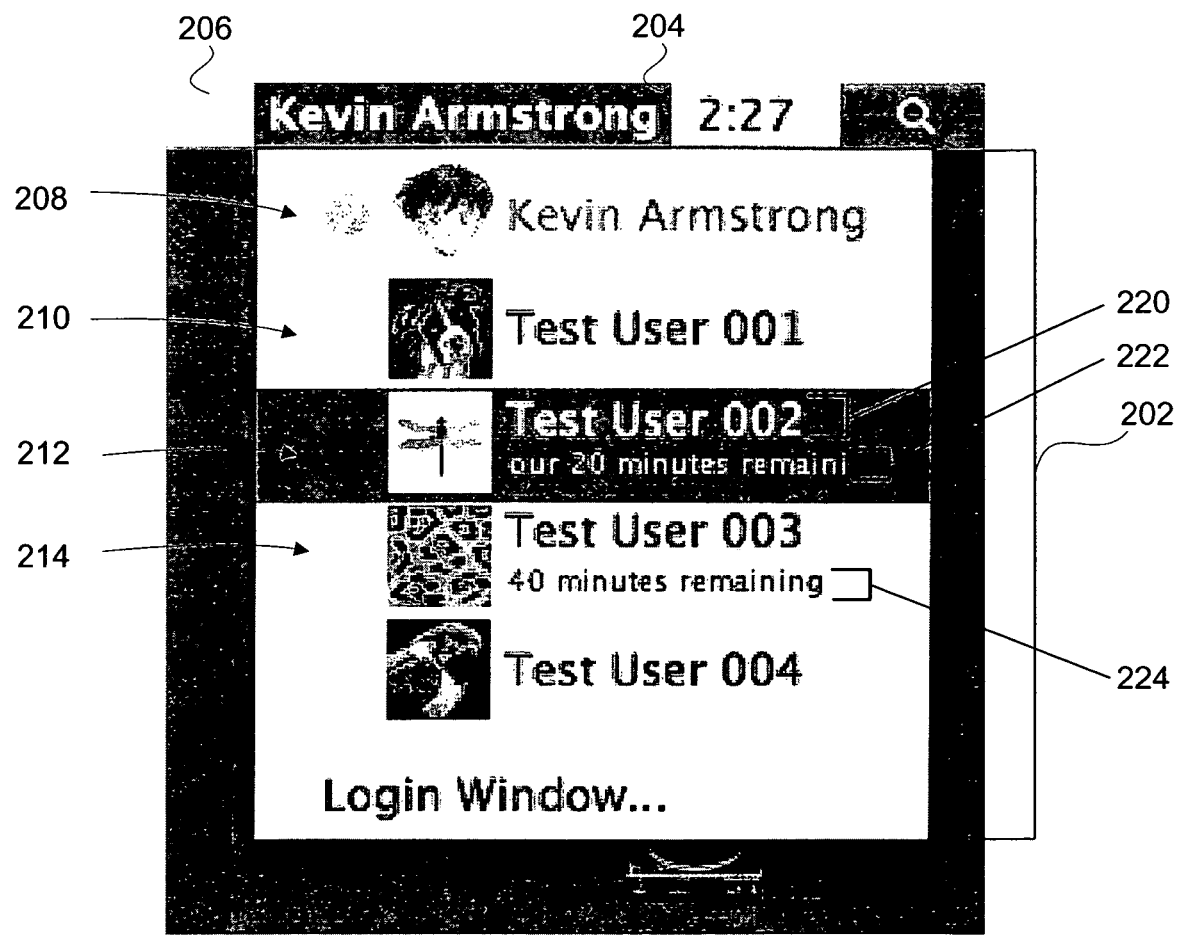
FIG. 2A illustrates an embodiment of a menu of the present invention.

FIG. 2A illustrates an embodiment of a pull-down menu 202 which describes user time quotas for a multi-user computing system. It will be appreciated that although aspects of the present invention are described with reference to a GUI displaying user time quotas, such reference is merely by way of example, and embodiments of the present invention are not to be construed as being limited to such an application.

Menu 202 is displayed in response to a user having selected a menu title 204 (e.g. Kevin Armstrong) from a menu bar 206. The menu 202 includes a plurality of menu items 208, 210, 212, 214. Menu item 208 is dimmed to indicate its unavailability. Menu item 212 is highlighted to indicate its status as currently selected. As described above, a menu item being currently selected does not necessarily mean that a command associated with the selected menu item has been initiated or activated; generally, no action occurs until another user action causes the selected item to be initiated (e.g. clicking a mouse button, releasing a mouse button, pressing enter or another key on a keyboard, issuing a spoken command, etc.). Rather, being currently selected indicates that the keyboard, cursor control device, or other user input control is focused on a particular menu item. The "focus" refers to an onscreen element (e.g. a menu item) to which user-generated input (e.g. keyboard input) is directed. Thus, although an item may be selected, the command associated with the selected item is only initiated upon additional user action. In one embodiment, a menu item may be selected by hovering a pointer for a pointing device (i.e. a mouse) over the menu item. A mouse pointer is a graphical indicator (for example, an arrow head or cursor) that appears on a GUI to represent current location of the mouse (or other pointing device) with respect to the GUI. In another embodiment, a menu item is selected when the user has indicated interest in receiving more information about a particular menu item, such as for example, by issuing a spoken command identifying a particular menu item.

Figure 1:
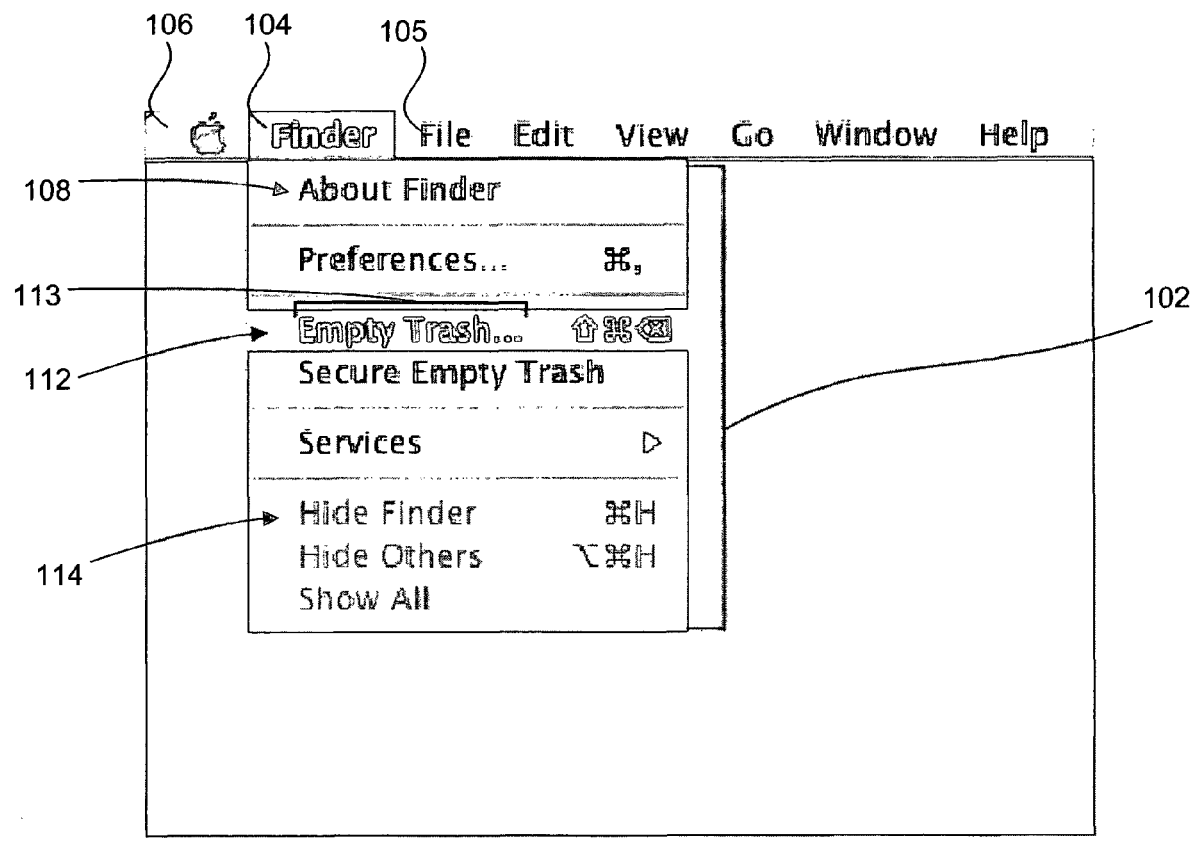
FIG. 1 illustrates a prior art example of a pull-down menu.

Menu item 212 includes two regions 220, 222. In one embodiment, the first region 220 is a static region which includes a menu item title, "Test User 002" in FIG. 2A. This portion of the menu item 220 is generally static, and in this respect, is similar to title 113 of the conventional menu item 112 illustrated in FIG. 1. In one embodiment, menu item 212 also includes a second region 222 that is an updatable region. By updatable, it is meant that content or information displayed within region 222 is capable of being updated or modified to present active, animated, or dynamic content or information (e.g. text, graphics, audio, video) that is capable of automatically changing or updating its appearance while the menu 202 is being displayed. In one exemplary embodiment, a menu item is updated to provide different or more detailed information about the menu item itself or an operation associated with the menu item.

In one embodiment, region 222 includes a second line of text for the menu item 212. In an exemplary embodiment, the second line of text may present a status or other additional information pertaining to the selected menu item. For example, the text within the updatable region 222 displays the quota (i.e. amount of time remaining) on a user account known as "Test User 002". The second line of text within region 222 is capable of being animated, such as for example by scrolling. In one embodiment, the content of region 222 automatically changes when the corresponding menu item 212 is selected from within menu 202. In another embodiment, the content of region 222 is capable of automatically changing whenever menu 202 is displayed, without necessarily requiring any input from a user other than initially accessing or causing the menu 202 to be displayed (e.g. such as by selecting the menu title 204 from the menu bar 206). Thus, in such an embodiment, regardless of whether any menu item is selected or even which menu item is currently selected, the content of region 222 is updatable.

For clarity, embodiments of the present invention are described herein with reference to use of textual content displayed within the updatable region 222, although it will be appreciated that other content, such as for example graphical content (e.g. image, video, animated icons), may be displayed within the region 222. In an exemplary embodiment illustrated in FIG. 2A, the content displayed within the updatable region 222 is displayed in a scrolling fashion (e.g. from right to left) upon selection of the corresponding menu item 212. In one embodiment, updatable region 222 is only active (e.g. actively scrolling) when a mouse pointer is hovering or positioned over the selected menu item 212 for a specific amount of time (e.g. 0.5 seconds). By limiting activity of the updatable region 222 to instances where the cursor is hovered above or positioned near the associated menu item 212, the amount of updating necessary for display of the menu can be limited. In addition, it may be desirable for the updatable region to become active only upon a trigger, such as hovering, in order to minimize the potential for a large amount of simultaneous scrolling and updating of the text in several menu items, which could be distracting to a user and also may unnecessarily consume processor cycles.

In one embodiment, the updatable region 222 is displayed within the graphical region within which the associated menu item may be activated (e.g. clicked upon) through use of a pointer. For example, referring to FIG. 2A, in one embodiment, updatable region 222 is presented within the rectangular region (denoted by the darkened band or highlighting of item 212) associated with menu item 212. The highlighted rectangular region of menu item 212 designates the boundaries or area within which a pointer may be positioned on the GUI either to select the menu item (i.e. cause it to be highlighted if presently unselected) or to activate (e.g. by clicking upon the menu item with a pointing device) the menu item to initiate a command or operation associated with the menu item. In one embodiment, although content within the updatable region changes when the corresponding menu item is selected, the function of the menu item is maintained. For example, referring to FIG. 2A, if the function of menu item 212 is to cause the current user of a computing system to be changed to "Test User 002" when menu item 212 is activated or initiated, this function remains constant whether the menu item 212 is currently selected or not. In other words, in one embodiment, selecting a menu item (and thereby causing text within the updatable region to scroll) does not alter the function of a command associated with the menu item. For example, items within a menu may each have associated keyboard shortcuts that may be input by a user to activate a command or function associated with a menu item; in one embodiment, the menu item's selected or un-selected status would not cause the menu item's command or function to be altered.

Figure 2B:
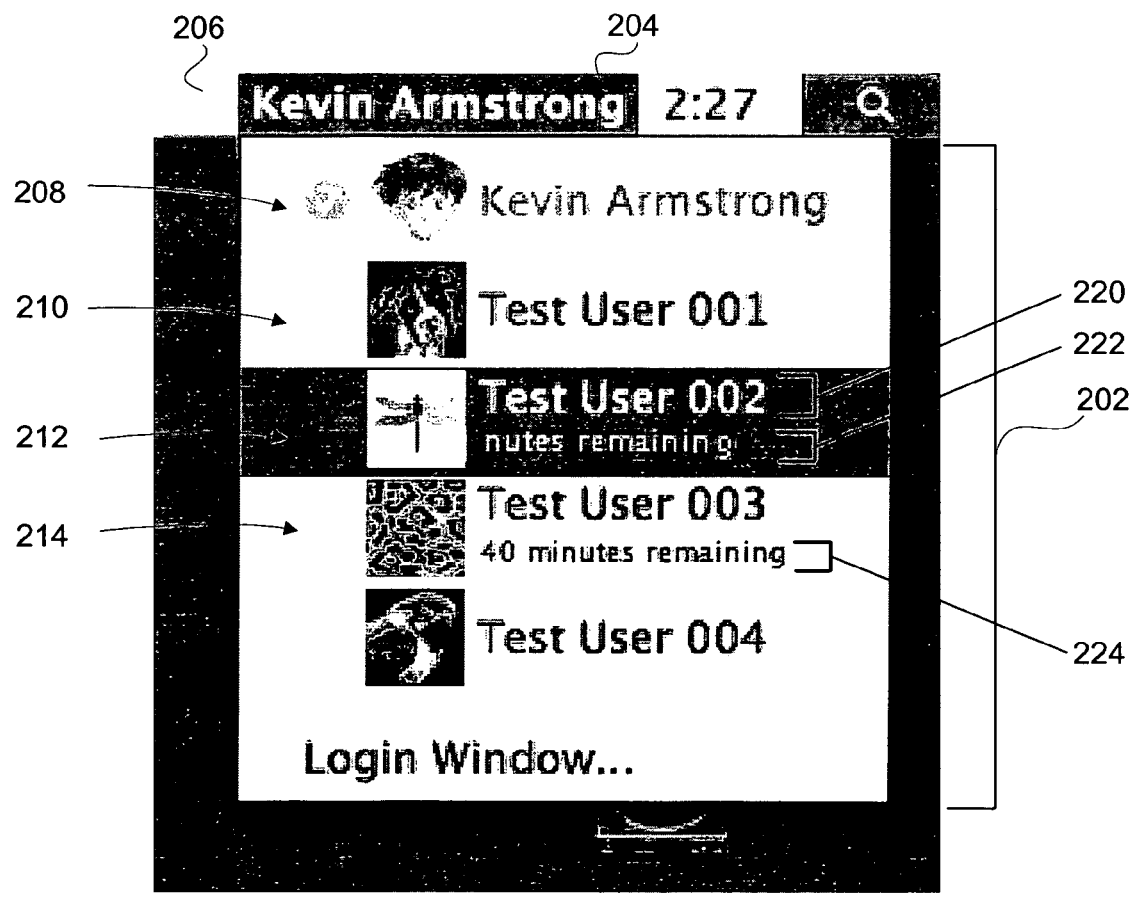
FIG. 2B illustrates an embodiment of a state of the menu illustrated in FIG. 2A.
Figure 2C:
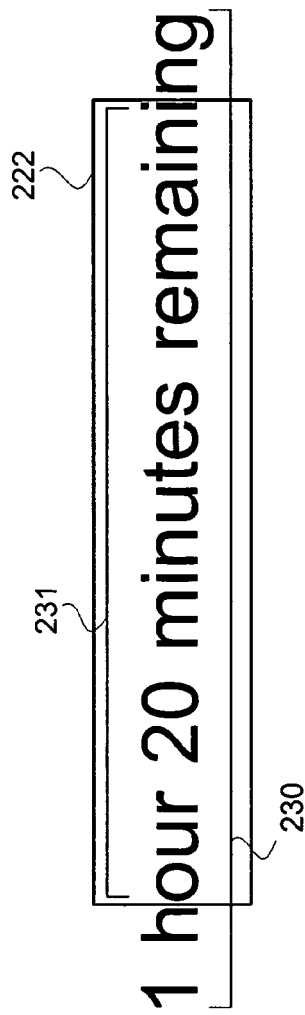
FIGS. 2C and 2D illustrate embodiments of horizontal scrolling.

The state of the updatable region 222 as illustrated in the embodiment of FIG. 2A, is illustrated in further detail in FIG. 2C. Referring to FIG. 2C, the text 230 ("1 hour 20 minutes remaining") is the text that is scrolled within the region 222. In one embodiment, this text is generated in real-time as the menu 220 is displayed (e.g. if the time remaining for a user changes, text 230 is updated to reflect this change while the text 230 is scrolling). In another embodiment, the text displayed in the region 222 is predetermined text. For example, the text may further describe the actions that will result from initiation of the currently selected menu item 212. The portion 231 of text 230 within the region 222 is the text that is currently displayed in the updatable region 222. As indicated in FIG. 2C, the text 230 scrolls across the region 222 in a right-to-left fashion; thus, the text 230 appears to originate from the right side of the region 222, and moves horizontally to the left of the region 222. In one embodiment, the direction of the horizontal scrolling (e.g. right-to-left or left-to right) depends upon localization of the computing system which generates the GUI including the menu. For example, in one embodiment, Roman text is scrolled in region 222 from right to left, since Roman text is read from left to right; however, Arabic text is scrolled from left to right, since Arabic text is read from right to left. In one embodiment, text scrolls horizontally along a line within the updatable region.

In other embodiments, text, graphics, or other content displayed within the updatable region 222 may be animated in other directions or manners. For example, in one embodiment, text displayed within the updatable region 222 increases in size upon the menu item being selected. For example, when a menu item 212 is selected, text within the updatable region may initially appear at a relatively small font size, such as 2 point font; however, as the menu item continues to be selected, the text increases in size, such as to 12 point font, to provide the impression that the text is moving towards the viewer. Alternatively, text within the updatable region may be displayed so as to appear as though it is "shrinking" or moving away from the user. In yet another embodiment, text, graphics, or other content presented within the updatable region is presented having a three dimensional appearance. In another embodiment, shadowing may change within the updatable region when a menu item is selected, for example to impart the perception of three dimensional motion of content within the updatable region.

Figure 2D:
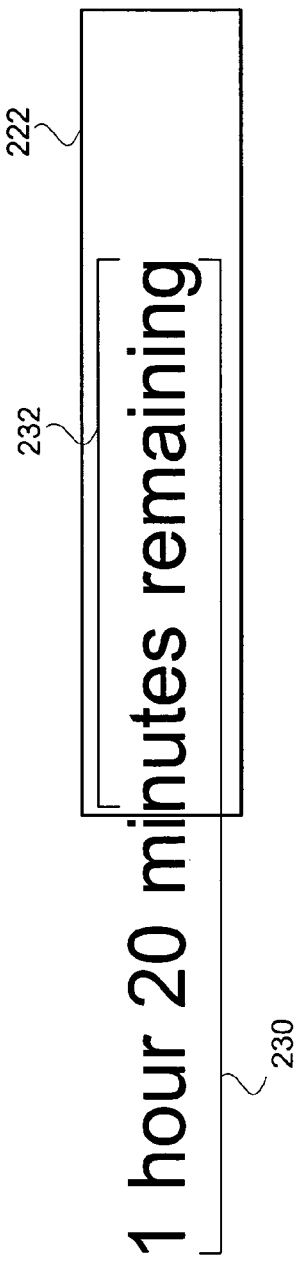

FIG. 2B illustrates the state of the menu 202 subsequent to a brief period after the state illustrated in FIG. 2A, in which the menu item 212 has remained selected. The text within the updatable region 222 has shifted to the left as compared to the state of FIG. 2A, as a result of the continuous right-to-left scrolling of the content of region 222. FIG. 2D illustrates an embodiment of the text displayed within region 222 of FIG. 2B in greater detail. The portion 232 of text 230 within region 222, represents the textual content that is currently displayed in the updatable region 222 in the state illustrated in FIG. 2B. As indicated in FIG. 2D, the text 230 scrolls across the region 222 in a right-to-left fashion.

In one embodiment, once the text 230 has scrolled completely out of the region 222, it may loop by reappearing again at right of the region 222 and repeating its right-to-left scrolling. If the informational content of the text 230 has changed since the last scroll cycle (e.g. the time remaining has changed from "1 hour 20 minutes" to "1 hour 19 minutes"), the text 230 may be updated when scrolled again. In another embodiment, due to the updatable nature of the menu item 220, the text 230 is capable of changing even as it is being presented within the updatable region 222 of the menu item. For example, the text might change automatically from "1 hour 20 minutes remaining" to "1 hour 19 minutes remaining" even as it is being scrolled and displayed within region 222. In this manner, the latest and most current information may be displayed within the menu 202 for the selected menu item 212.

Referring again to FIG. 2A, menu item 214 is similar to menu item 212 in its ability to present updatable content, as it includes an updatable region 224. However, menu item 214 as depicted in FIG. 2A is in an unselected or idle state, and thus is not highlighted (as is menu item 212). Furthermore, in the embodiment illustrated in FIGS. 2A and 2B, since menu item 214 is unselected, the contents of updatable region 224 remain static; upon selection of menu item 214, region 224 would become active and begin scrolling. Thus, in one embodiment, in an unselected state, content within an updatable region of a menu item may be displayed, although it remains static until selected.

In another embodiment, region 224 is active (e.g. scrolling) while in an unselected state. This would allow for additional information to be displayed for a plurality of menu items, whether selected or not. However, such an implementation may become distracting to the user if there is too much simultaneous movement within the menu 202.

It should be noted that menu item 210 is not illustrated as including an updatable region 222. Thus, in one embodiment, within a single menu 202, updatable menu items (e.g. 212, 214) may be co-located with static or conventional appearing menu items such as 210. In another embodiment, an item such as item 210 may initially display only the menu item title (e.g. "Test User 001") when the item 210 is in an unselected state; however, upon becoming selected, an updatable region (such as region 222) may dynamically appear and scroll within the menu item 210, to convey additional information about the selected item to the user.

Figure 3A:
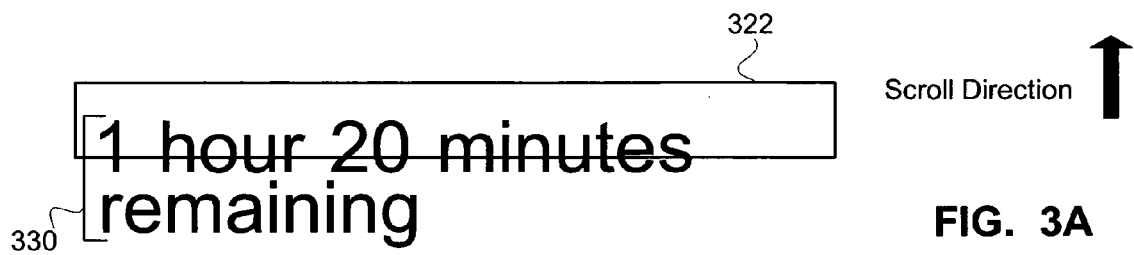
FIGS. 3A-3C illustrate embodiments of vertical scrolling.
Figure 3B:
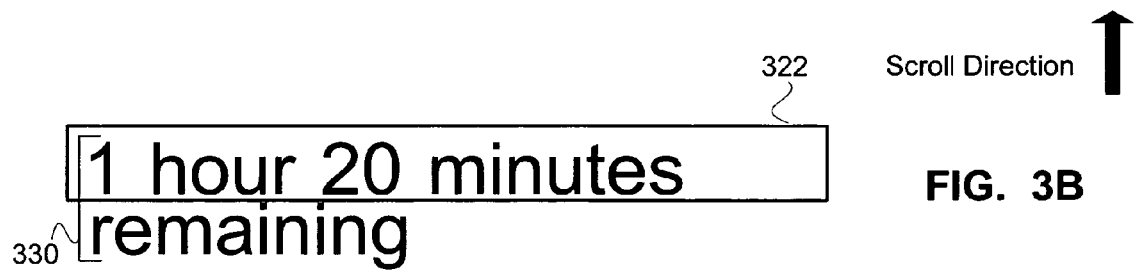
Figure 3C:

It will be appreciated that text or other content within the updatable region of a menu item may be displayed and/or animated in various ways. In particular, it is contemplated that in addition to horizontal scrolling of text (e.g. right to left, left to right), vertical scrolling and combinations of vertical and horizontal scrolling may be used with embodiments of the present invention. FIGS. 3A, 3B and 3C illustrate sequential embodiments of a vertical scrolling implementation, and in particular, scrolling in an upwards direction. Referring to FIG. 3A, the region bound by rectangle 322 represents the updatable region of the menu item, such as region 222 of menu item 212 of FIG. 2A. As the text 330 begins to scroll upwards, it appears initially at the bottom portion of the region 322. Referring to FIG. 3B, the text 330 continues upward through the region 322. To fit the text within the horizontal dimension of the region 322, line breaks are used to display the text 330 over several lines. Referring to FIG. 3C, as the text 330 continues its upward movement, the text 330 is scrolled out of the region 322 and eventually out of view entirely. In one embodiment, once the text 330 has scrolled completely out of the region 322, it may loop by reappearing at the bottom of the region and repeating its vertical scrolling. In yet another embodiment, where text 330 includes a plurality of sentences, a first sentence of the text 330 may scroll horizontally, while a second sentence scrolls vertically.

Figure 4:
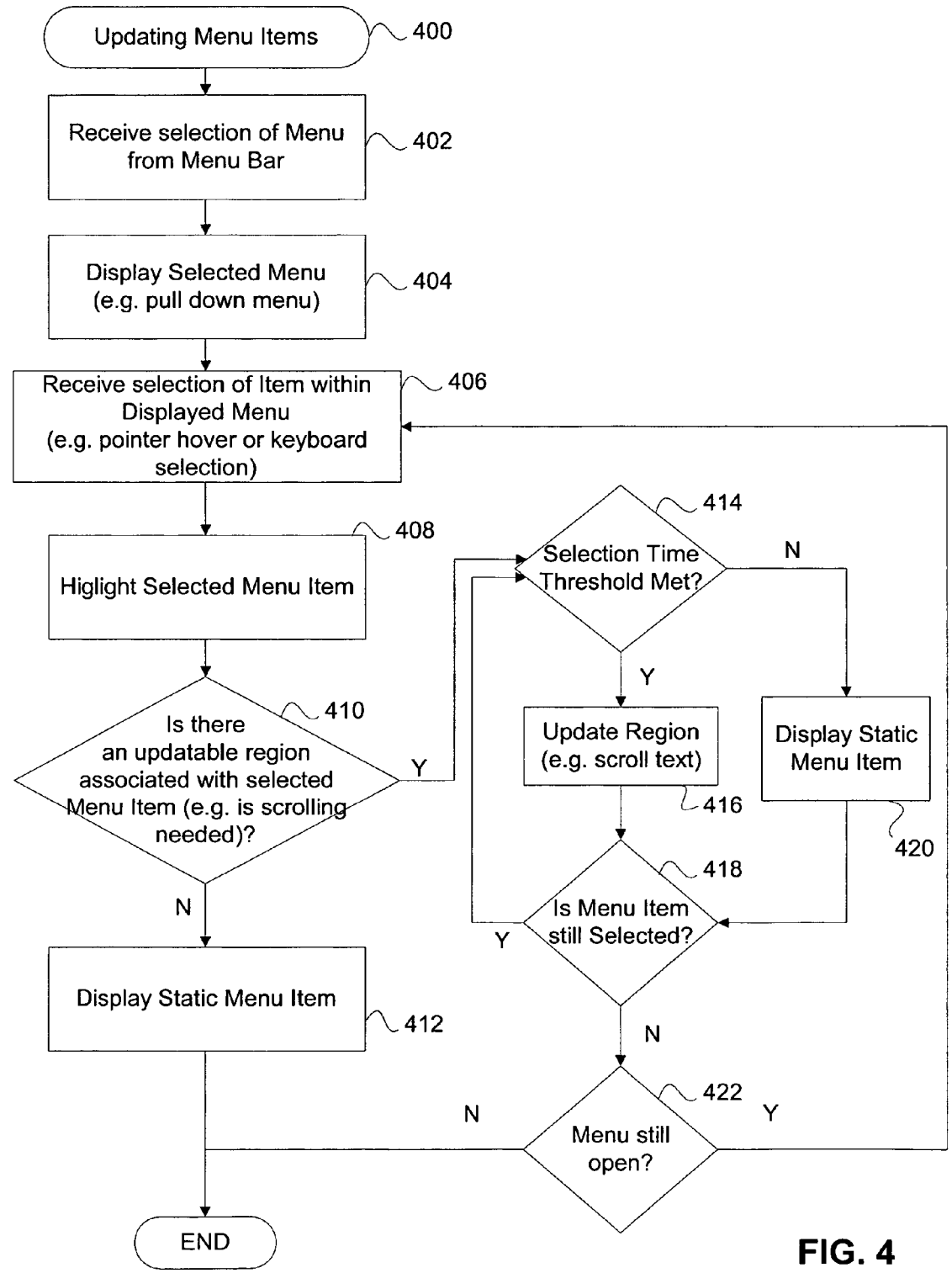
FIG. 4 illustrates an embodiment of a method for updating menu items.

FIG. 4 illustrates an embodiment of a method 400 for updating menu items of a graphical user interface (GUI). In one embodiment, the method 400 may be implemented to generate the menu 202 illustrated in FIG. 2A. At block 402, the method 400 receives a selection of a menu from a menu bar. For example, a user may use either keyboard commands or a pointing device such as a mouse, to access a menu (e.g. a pull-down menu) from a menu bar. In another embodiment, a menu may be accessed by any of various other well known means, such as by using a mouse or keyboard to access a contextual menu (e.g. by "right clicking" a mouse within an application). The selected or accessed menu is then displayed by the method 400 at block 404. The displayed menu includes a plurality of menu items from which a user can choose. In an alternative embodiment, not illustrated in FIG. 4, updatable menu items within the menu automatically become animated (e.g. scrolling text) upon displaying the menu at block 404, without further requiring selection of a menu item as a trigger for the animation of the updatable region.

Referring again to the embodiment illustrated in FIG. 4, at block 406, the method 400 receives a selection of an item within the displayed menu. In one embodiment, the selection may be made by a user using a keyboard to navigate through the available items presented within the menu. In another embodiment, the selection may be made by a user positioning a pointer on a menu item for a specified amount of time (e.g. about 0.5 seconds or 1 second). In one embodiment, the selected menu item is highlighted at block 408 upon being selected, to indicate the selected status to the user.

At block 410, the method 400 determines whether there is any updatable region associated with the selected menu item. For example, in one embodiment, the method 400 determines whether there is any text that needs to be scrolled within the selected menu item. If there is no updatable region within the selected menu item (such as menu item 210 of FIG. 2A), then the method 400 displays a static menu item at block 412. In another embodiment, a selected menu item may include an additional line of text that is capable of being updated, however, if the content of the additional text is narrower than the width of the displayed menu, the text will not be scrolled.

If there is an updatable region within the selected menu item, the method 400 determines whether a selection time threshold has been met at block 414. The selection time threshold is a period of time used to trigger activity of the updatable region within the selected menu item. This delays activity (e.g. scrolling of text) within the updatable region until the selected menu item has been in a selected state for at least a time period equal to the time threshold. In one embodiment, the time threshold is about 0.5 seconds. It will be appreciated that longer or shorter time thresholds may be implemented in other embodiments. In an alternative embodiment, there may be no time threshold, and the updatable region becomes active immediately upon selection. When the time threshold has been met at block 414, the updatable region of the selected menu item becomes active (e.g. text will begin to scroll) at block 416. In one embodiment, as long as the menu item remains selected (block 418), the updatable region will remain active, e.g. text will continue to scroll in the active region.

In one embodiment, if a different menu item is selected while a region of the currently selected menu item is scrolling or otherwise active, the updatable region reverts to a static state, in which the updatable region displays the scrolling text as it appeared when the item became unselected, i.e. the scrolling pauses when the menu item is deselected. For example, referring to FIG. 2A, if item 214 was initially selected and was actively scrolling the text "2 hours 40 minutes remaining", with only "40 minutes remaining" displayed within the updatable region 224 when item 212 was selected, menu item 214 would then become static, and the updatable region 224 of unselected item 214 would statically display only "40 minutes remaining". In one embodiment, if menu item 214 is later selected, the scrolling may resume where it left off.

In another embodiment, where multiple elements within a graphical user interface object may be concurrently selected (e.g. by pressing a modifier key while selecting successive elements with a pointer), updatable regions of each of the selected elements may be active (e.g. scrolling). In yet another embodiment, where multiple GUI elements are concurrently selected, only the most recently selected element's updatable region is active, while the other concurrently selected menu items' updatable regions are static.

In an alternative embodiment, when an updatable menu item is deselected, the scrollable text within the active region reverts to an initial state. For example, referring to FIG. 2A, where item 212 is subsequently deselected and another item in the menu 202 is selected, the text displayed within the updatable region 222 may reset to display the beginning of the sentence, such as "1 hour 20 minutes rema". In one embodiment, an ellipsis may be appended to the end of a truncated string of text within the updatable region 222 to indicate the availability of additional text capable of being displayed or scrolled into view.

In one embodiment of the method 400, the information displayed in the updatable region of the selected menu item is generated in real-time; thus, the content of the information displayed may change as the text is scrolling in the updatable region.

If the time threshold has not been met at block 414, the menu item is displayed in a static state (e.g. no scrolling of text) at block 420. For example, a user may cycle through intermediate available menu items prior to accessing their target menu item; in such a case, the updatable regions of the intermediate menu items may not need to be triggered. The method 400 then determines at block 418 whether the same menu item is still selected. If the menu item remains selected, the method 400 returns to block 414 to again determine whether the time threshold has been met. If the menu item is not still selected at block 418, the method 400 determines at block 422 whether the menu is still open (i.e. is the menu still being displayed). If the menu is still open, as in the case where a user is navigating through the various menu items within the menu, the method 400 returns to block 406 to receive a selection of an item in the menu.

In another embodiment of the method 400, the updatable regions of the menu items are active whenever the menu is displayed or accessed, regardless of whether a particular menu item (or any menu item) is selected.

Although embodiments of the present invention are described primarily with respect to pull-down menus (a type of pop-up menu that appears directly beneath the selected object), it will be appreciated that embodiments of the invention may be implemented within other types of graphical user interface menus, such as, but not limited to, menus in which options are highlighted by a bar that is moved from one menu item to another, pop-up menus (e.g. a menu activated by clicking an on-screen button), contextual menus (a menu that appears temporarily when a mouse button is right clicked on a selection; once a selection is made from a contextual menu, the menu usually disappears), cascading menus (a submenu that opens when a choice from another menu is selected), tear-off menus (a pop-up menu that can be moved around the screen like a window), etc. Embodiments of the present invention may also be implemented in hierarchical menus (submenus). In another embodiment, aspects of the present invention may be applied to other GUI objects besides menus, such as for example, tables. For example, in one embodiment, when a row within a table is selected, text within the selected row may begin to scroll. Additionally, embodiments of the present invention may be implemented within graphical user interfaces of varied environments, such as, but not limited to, operating systems, application programs, or web pages.

In one embodiment, the second line of text in the menu item may be presented with special attributes to impart further information to a user. For example, in addition to scrolling, the speed of the scrolling, the color or typeface of the text font, or other characteristics of the second line of information within a menu item may varied. For example, to indicate the severity of a line of information, the text of the second line (i.e. updatable region) may be presented in red to indicate urgent information, whereas non-urgent information is presented in black text.

In one embodiment, more than two lines of text may be displayed within a menu item. In another embodiment, the first line of text in a menu item may be updatable, and the second line of text is static.

In one embodiment, selecting a menu item (such as for example by hovering a pointer over an updatable menu item) for a predetermined period of time results in different types of information or content being displayed within the updatable region. For example, referring to FIG. 2A, when a pointer is initially hovered over item 212 for up to a first time period (e.g. ten seconds), the text within the updatable region 222 scrolls to display the quota (time remaining) on a user account (i.e. "1 hour 20 minutes remaining"). However, once the pointer has been continuously hovered over item 212 for an amount of time equal to or over the first time period (e.g. greater than ten seconds), the text within the updatable region changes from quota information to some other type of information, such as for example data transfer statistics, or other information associated with the user account or menu item. In one embodiment, the level of detail for the information presented within the updatable region increases with the duration for which the menu item has been selected.

Figure 5A:
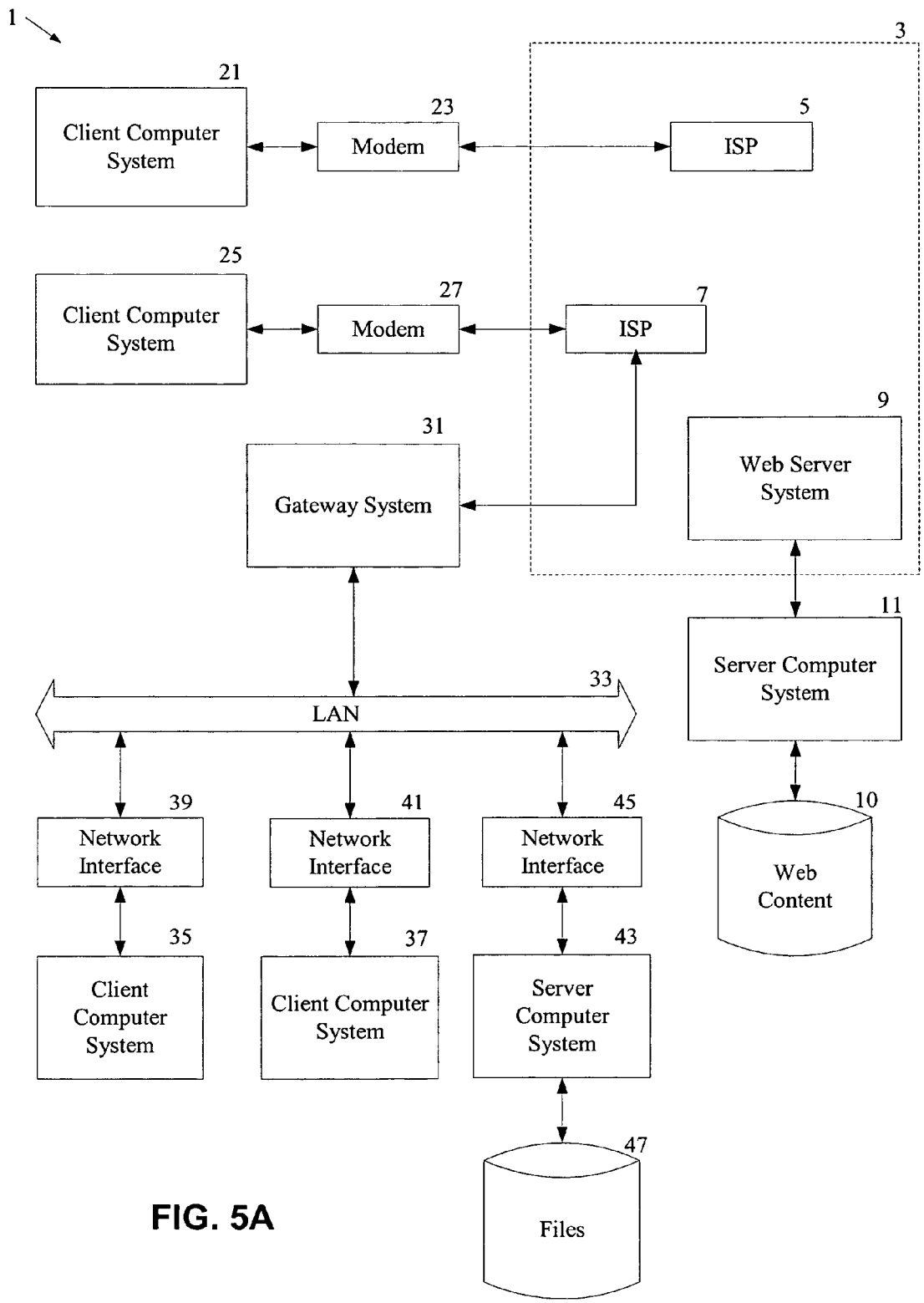
FIG. 5A illustrates an embodiment of an operating environment suitable for practicing the present invention.
Figure 5B:
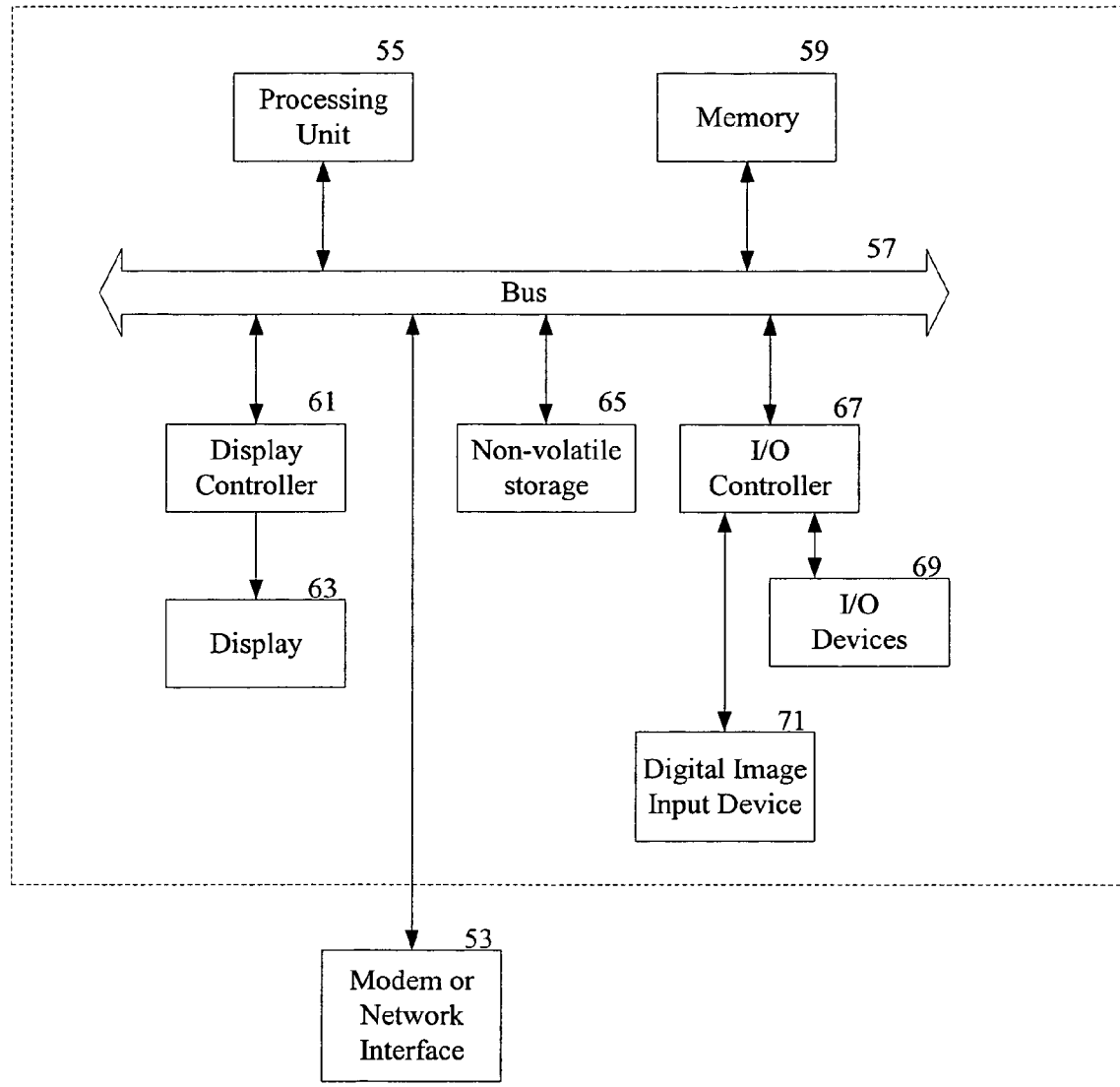
FIG. 5B illustrates an embodiment of a computer system suitable for use in the operating environment of FIG. 5A.

The following description of FIGS. 5A and 5B is intended to provide an overview of computer hardware and other operating components suitable for implementing embodiments of the invention described herein, but is not intended to limit the applicable environments. One of skill in the art will immediately appreciate that the invention can be practiced with other computer system configurations, including hand-held devices, cellular telephones, multiprocessor systems, microprocessor-based or programmable consumer electronics/appliances, network PCs, minicomputers, mainframe computers, and the like. Embodiments of the invention can also be practiced in distributed computing environments where tasks are performed by remote processing devices that are linked through a communications network.

FIG. 5A shows several computer systems 1 that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7. Users on client systems, such as client computer systems 21, 25, 35, and 37 obtain access to the Internet through the Internet service providers, such as ISPs 5 and 7. Access to the Internet allows users of the client computer systems to exchange information, receive and send emails and instant messages, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 5A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, consumer electronics/appliance, a network computer, a Web TV system, a handheld device, or other such computer system. Similarly, the ISP 7 provides Internet connectivity for client systems 25, 35, and 37, although as shown in FIG. 5A, the connections are not the same for these three computer systems. Client computer system 25 is coupled through a modem interface 27 while client computer systems 35 and 37 are part of a LAN. While FIG. 5A shows the interfaces 23 and 27 as generically as a "modem," it will be appreciated that each of these interfaces can be an analog modem, ISDN modem, DSL modem, cable modem, satellite transmission interface, or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31.

FIG. 5B shows one example of a conventional computer system that can be used as a client computer system or a server computer system or as a web server system, for use with embodiments of the present invention The computer system of FIG. 5B may, for example, be an Apple Macintosh computer. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, DSL modem, cable modem, token ring interface, satellite transmission interface, or other interfaces for coupling a computer system to other computer systems. The computer system 51 includes a processing unit 55, which can be a conventional microprocessor such as a G3, G4, or G5 microprocessor from Motorola, Inc. or IBM, a Motorola Power PC microprocessor, or an Intel Pentium microprocessor. Memory 59 is coupled to the processor 55 by a bus 57. Memory 59 can be dynamic random access memory (DRAM) and can also include static RAM (SRAM), among other types of well-known memory devices. The bus 57 couples the processor 55 to the memory 59 and also to non-volatile storage 65 and to display controller 61 and to the input/output (I/O) controller 67. The display controller 61 controls in the conventional manner a display on a display device 63 which can be a cathode ray tube (CRT) or liquid crystal display (LCD). The input/output devices 69 can include a keyboard, disk drives, printers, a scanner, and other input and output devices, including a mouse or other pointing device. The display controller 61 and the I/O controller 67 can be implemented with conventional well known technology. A digital image input device 71 can be a digital camera which is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the terms "computer-readable medium" and "machine-readable medium" include any type of storage device that is accessible by the processor 55 and also encompass a carrier wave that encodes a data signal.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 and the memory 59 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 59 for execution by the processor 55. A Web TV system, which is known in the art, is also considered to be a computer system according to the present invention, but it may lack some of the features shown in FIG. 5B, such as certain input or output devices. A typical computer system will usually include at least a processor, memory, and a bus coupling the memory to the processor.

It will also be appreciated that the computer system 51 is controlled by operating system software which includes a file management system, such as a disk operating system, which is part of the operating system software. One example of an operating system software with its associated file management system software is the family of operating systems known as Mace OS operating system from Apple Computer, Inc. of Cupertino, Calif., and their associated file management systems. The file management system is typically stored in the non-volatile storage 65 and causes the processor 55 to execute the various acts required by the operating system to input and output data and to store data in memory, including storing files on the non-volatile storage 65.

The methods described above constitute computer programs made up of computer-executable instructions illustrated as blocks (acts) within the flow chart of FIG. 4. Describing the methods by reference to a flow chart enables one skilled in the art to develop such programs including such instructions to carry out the methods on suitably configured computers (the processor of the computer executing the instructions from computer-readable media, including memory). The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be appreciated that more or fewer processes may be incorporated into the method illustrated in FIG. 4 without departing from the scope of the invention and that no particular order is implied by the arrangement of blocks shown and described herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A machine-implemented method comprising:
   displaying a region in a graphical user interface for receiving a command to cause a menu to be displayed;
   displaying, in response to receiving the command, the menu;
   displaying, on a display device, the menu within the graphical user interface, the menu including a plurality of selectable menu items, including a first menu item and an intermediate menu item, within the menu, wherein the first menu item includes a first region and a separate second region, the first region presenting a static title for the menu item, and the second region including text that is capable of scrolling;
   selecting the first menu item through the intermediate menu item; and
   automatically loop scrolling the text, in response to receiving the command to display the menu on the display device, within the second region of the first menu item but not the intermediate menu item, wherein the automatic loop scrolling the text further includes an animation selected from one of the following: horizontal loop scrolling right-to-left, horizontal loop scrolling left-to-right, vertical loop scrolling, content increasing in size, content decreasing in size, content presented having three-dimensional appearance, content having shadowing, content having a change in shadowing, scrolling during an unselected state, scrolling a first sentence horizontally while a second sentence scrolls vertically, and wherein, information communicated by the scrolling of the text automatically and dynamically changes as the text scrolls.

2. The method of claim 1, further comprising:
   receiving a selection of the first menu item, wherein the scrolling occurs prior to the receiving the selection of the first menu item.

3. The method of claim 2, wherein the selection comprises a pointer hovering above the first menu item and wherein the method further comprises determining if a time threshold has been met with respect to receiving the selection of the first menu item, and wherein the scrolling is in response to the determining of the time threshold.

4. The method of claim 3, further comprising:
   pausing the scrolling of the text when the pointer is not positioned above the first menu item.

5. An apparatus comprising:
   a processing unit coupled to a memory through a bus;
   means for displaying a region in a graphical user interface for receiving a command to cause a menu to be displayed;
   means for displaying, in response to receiving the command, the menu;
   means for displaying the menu within the graphical user interface on a display device coupled to the processing unit, the menu including a plurality of selectable menu items, including a first menu item and an intermediate menu item, within the menu, wherein the first menu item includes a first region and a separate second region, the first region presenting a static title for the menu item, and the second region including text that is capable of automatically scrolling;
   means for selecting the first menu item through the intermediate menu item; and
   means for loop scrolling the text within the second region of the first menu item but not the intermediate menu item in response to receiving the command to display the menu, wherein the automatic loop scrolling of the text includes an animation selected from one of the following: horizontal loop scrolling right-to-left, horizontal loop scrolling left-to-right, vertical loop scrolling, content increasing in size, content decreasing in size, content presented having three-dimensional appearance, content having shadowing, content having a change in shadowing, scrolling during an unselected state, scrolling a first sentence horizontally while a second sentence scrolls vertically, and wherein, information communicated by the scrolling of the text automatically and dynamically changes as the text scrolls.

6. The apparatus of claim 5, further comprising:
   means for receiving a selection of the first menu item, wherein the scrolling occurs prior to the receiving the selection of the first menu item.

7. The apparatus of claim 6, wherein the selection comprises a pointer hovering above the first menu item.

8. The apparatus of claim 7, further comprising:
   means for pausing the scrolling of the text when the pointer is not positioned above the first menu item.

9. A machine-implemented method comprising:
   displaying a region in a graphical user interface for receiving a command to cause a menu to be displayed;
   displaying, in response to receiving the command, the menu;
   presenting, on a display device, the menu within the graphical user interface;
   receiving a selection of a menu item through an intermediate menu item within the menu;
   determining, through a quota, if a time threshold has been met with respect to receiving the selection of the first menu item; and
   in response to determining the time threshold, automatically loop scrolling text within the selected menu item but not the intermediate menu item; wherein the automatic loop scrolling of the text further includes an animation selected from one of the following: horizontal loop scrolling right-to-left, horizontal loop scrolling left-to-right, vertical loop scrolling, content increasing in size, content decreasing in size, content presented having three-dimensional appearance, content having shadowing, content having a change in shadowing, scrolling during an unselected state, scrolling a first sentence horizontally while a second sentence scrolls vertically, and wherein, information communicated by the scrolling text automatically and dynamically changes as the text scrolls.

10. The method of claim 9, wherein the menu item includes a first line of text and a second line of text, the first line of text being static, and the second line of text capable of scrolling.

11. The method of claim 9, further comprising:
generating the content of the second line of text in real-time, wherein the second line of text scrolls.

12. The method of claim 9, wherein receiving the selection comprises positioning a pointer above the menu item.

13. An apparatus comprising:
a processing unit coupled to a memory through a bus;
means for displaying a region in a graphical user interface for receiving a command to cause a menu to be displayed;
means for displaying, in response to receiving the command, the menu;
means for presenting the menu within the graphical user interface on a display device coupled to the processing unit;
means for receiving a selection of a menu item through an intermediate menu item within the menu;
means for determining, through a quota if a time threshold has been met with respect to receiving the selection of the first menu item; and
means for loop scrolling text automatically within the selected menu item but not the intermediate menu item in response to determining the time threshold; wherein the automatic loop scrolling of the text includes an animation selected from one of the following: horizontal scrolling right-to-left, horizontal scrolling left-to-right, vertical scrolling upwards, vertical scrolling, content increasing in size, content decreasing in size, content presented having three-dimensional appearance, content having shadowing, content having a change in shadowing, scrolling during an unselected state, scrolling a first sentence horizontally while a second sentence scrolls vertically, and wherein, information communicated by the scrolling text automatically and dynamically changes as the text scrolls.

14. The apparatus of claim 13, further comprising:
means for generating the content of the second line of text in real-time, wherein the second line of text scrolls.

15. The apparatus of claim 13, wherein the means for receiving the selection comprises a pointer positioned above the menu item.

16. A machine-implemented method comprising:
displaying a region in a graphical user interface for receiving a command to cause a menu to be displayed;
displaying, in response to receiving the command, the menu;
displaying, on a display device, a menu within a graphical user interface, the menu including a plurality of selectable menu items which include a first menu item and an intermediate menu item, wherein the first menu item includes a first line of text and a separate second line of text; and
automatically animating the second line of text of the first menu item but not the intermediate menu item upon displaying the menu in response to receiving the command to display the menu, the first menu item being selected through the intermediate menu item, wherein the automatic animating of the second line of text includes an animation selected from one of the following: horizontal loop scrolling right-to-left, horizontal loop scrolling left-to-right, vertical loop scrolling, and one or more of the following animations: content increasing in size, content decreasing in size, content presented having three- dimensional appearance, content having shadowing, content having a change in shadowing, scrolling during an unselected state, and scrolling a first sentence horizontally while a second sentence scrolls vertically, and wherein, information communicated by the scrolling text automatically and dynamically changes as the text scrolls.

17. The method of claim 16, wherein automatically animating the second line of text includes scrolling the second line of text.

18. The method of claim 17, wherein the second line of text scrolls horizontally.

19. An apparatus comprising:
a processing unit coupled to a memory through a bus;
means for displaying a region in a graphical user interface for receiving a command to cause a menu to be displayed;
means for displaying, in response to receiving the command, the menu;
means for displaying, on a display device, the menu within the graphical user interface, the menu including a plurality of selectable menu items which include a first menu item and an intermediate menu item, wherein the first menu item includes a first line of text and a separate second line of text; and
means for automatically animating the second line of text of the first menu item but not the intermediate menu item upon displaying the menu in response to receiving the command to display the menu, the first menu item being selected through the intermediate menu item, wherein the automatic animating of the second line of text includes an animation selected from one of the following: horizontal loop scrolling right-to-left, horizontal loop scrolling left-to-right, vertical loop scrolling, and one or more of the following animations: content increasing in size, content decreasing in size, content presented having three-dimensional appearance, content having shadowing, content having a change in shadowing, scrolling during an unselected state, and scrolling a first sentence horizontally while a second sentence scrolls vertically, and wherein, information communicated by the scrolling text automatically and dynamically changes as the text scrolls.

20. The apparatus of claim 19, wherein the means for automatically animating the second line of text includes scrolling the second line of text.

21. The apparatus of claim 20, wherein the second line of text scrolls vertically.

22. A machine-readable storage medium storing instructions to cause a machine to perform a machine-implemented method comprising:
displaying a region in a graphical user interface for receiving a command to cause a menu to be displayed;
displaying, in response to receiving the command, the menu;

displaying, on a display device, the menu within the graphical user interface, the menu including a plurality of selectable menu items which include a first menu item and an intermediate menu item, wherein the first menu item includes a first line of text and a separate second line of text; and automatically animating the second line of text of the first menu item but not the intermediate menu item upon displaying the menu in response to receiving the command to display the menu, the first menu item being selected through the intermediate menu item, wherein the automatic animating of the second line of text includes an animation selected from one of the following: horizontal loop scrolling right-to-left, horizontal loop scrolling left-to-right, vertical loop scrolling, and one or more of the following animations:

content increasing in size, content decreasing in size, content presented having three-dimensional appearance, content having shadowing, content having a change in shadowing, scrolling during an unselected state, and scrolling a first sentence horizontally while a second sentence scrolls vertically, and wherein, information communicated by the scrolling text automatically and dynamically changes as the text scrolls.

23. The machine-readable storage medium of claim 22, wherein automatically animating the second line of text includes scrolling the second line of text.

24. The machine-readable storage medium of claim 23, wherein the second line of text scrolls horizontally.

25. A system comprising:
a processing unit coupled to a memory through a bus; and
a process executed from the memory by the processing unit to cause the processing unit to:
display a region in a graphical user interface for receiving a command to cause a menu to be displayed;
display, in response to receiving the command, the menu;
display, on a display device, the menu within the graphical user interface, the menu including a plurality of selectable menu items which include a first menu item and an intermediate menu item, wherein the first menu item includes a first line of text and a separate second line of text; and
automatically animating the second line of text of the first menu item but not the intermediate menu item upon displaying the menu in response to receiving the command to display the menu, the first menu item being selected through the intermediate menu item, wherein the automatic animating of the second line of text includes an animation selected from one of the following: horizontal loop scrolling right-to-left, horizontal loop scrolling left-to-right, vertical loop scrolling, and one or more of the following animations: content increasing in size, content decreasing in size, content presented having three-dimensional appearance, content having shadowing, content having a change in shadowing, scrolling during an unselected state, and scrolling a first sentence horizontally while a second sentence scrolls vertically, and wherein, information communicated by the scrolling text automatically and dynamically changes as the text scrolls.

26. The system of claim 25, wherein automatically animating the second line of text includes scrolling the second line of text.

27. A machine-implemented method comprising:
displaying a region in a graphical user interface for receiving a command to cause an object to be displayed;

displaying, in response to receiving the command, the object;
displaying, on a display device, an object within the graphical user interface, the object including a plurality of selectable items, each item including a static region and a separate updatable region; and
receiving a selection of a first selectable item through an intermediate selectable item within the object, wherein upon receiving the selection, text within the selected first item but not the intermediate selectable item automatically scrolls, wherein the selection is made by hovering a pointer above the first item for a predetermined period of time, as determined through a quota; wherein the automatic scrolling of the text includes an animation selected from one of the following: horizontal loop scrolling right-to-left, horizontal loop scrolling left-to-right, vertical loop scrolling, and one or more of the following animations: content increasing in size, content decreasing in size, content presented having three-dimensional appearance, content having shadowing, content having a change in shadowing, scrolling during an unselected state, scrolling a first sentence horizontally while a second sentence scrolls vertically, and wherein, information communicated by the scrolling text automatically and dynamically changes as the text scrolls.

28. The method of claim 27, wherein the object is selected from the group consisting of a menu and a table.

29. An apparatus comprising:
a processing unit coupled to a memory through a bus;
means for displaying a region in a graphical user interface for receiving a command to cause an object to be displayed;
means for displaying, in response to receiving the command, the object;
means for displaying the object within the graphical user interface on a display device coupled to the processing unit, the object including a plurality of selectable items, each item including a static region and a separate updatable region; and
means for receiving a selection of a first selectable item through an intermediate selectable item within the object, wherein upon receiving the selection, text within the selected first item but not the intermediate selectable item automatically scrolls, wherein the selection is made by positioning a pointer above the first item for a predetermined period of time, as determined through a quota; wherein animating the content includes an animation selected from one of the following: horizontal loop scrolling right-to-left, horizontal loop scrolling left-to-right, vertical loop scrolling, and one or more of the following animations: content increasing in size, content decreasing in size, content presented having three-dimensional appearance, content having shadowing, content having a change in shadowing, scrolling during an unselected state, scrolling a first sentence horizontally while a second sentence scrolls vertically, and wherein, information communicated by the scrolling text automatically and dynamically changes as the text scrolls.

30. The apparatus of claim 29, wherein the object is a menu.

31. A machine-readable storage medium storing instructions to cause a machine to perform a machine-implemented method comprising:
displaying a region in a graphical user interface for receiving a command to cause an object to be displayed;

displaying, in response to receiving the command, the object;

displaying, on a display device, the object within the graphical user interface, the object including a plurality of selectable items, each item including a static region and a separate updatable region; and receiving a selection of a first selectable item through an intermediate selectable item within the object, wherein upon receiving the selection, text within the selected first item but not the intermediate selectable item automatically scrolls, wherein the selection is made by hovering a pointer above the first item for a predetermined period of time as determined through a quota; wherein animating the content includes an animation selected from one of the following: horizontal loop scrolling right-to-left, horizontal loop scrolling left-to-right, vertical loop scrolling, and one or more of the following animations: content increasing in size, content decreasing in size, content presented having three-dimensional appearance, content having shadowing, content having a change in shadowing, scrolling during an unselected state, scrolling a first sentence horizontally while a second sentence scrolls vertically, and wherein, information communicated by the scrolling text automatically and dynamically changes as the text scrolls.

32. The machine-readable medium of claim 31, wherein the object is selected from the group consisting of a menu and a table.

* * * * *

UNITED STATES PATENT AND TRADEMARK OFFICE
CERTIFICATE OF CORRECTION

| | | |
|---|---|---|
| PATENT NO. | : 7,856,602 B2 | Page 1 of 1 |
| APPLICATION NO. | : 11/111177 | |
| DATED | : December 21, 2010 | |
| INVENTOR(S) | : Kevin Neal Armstrong | |

It is certified that error appears in the above-identified patent and that said Letters Patent is hereby corrected as shown below:

Sheet 6 of 8, in Figure 4, Box 408, line 1, delete "Higlight" and insert -- Highlight --, therefor.

In column 12, line 47, delete "Mace" and insert -- Mac® --, therefor.

In column 15, line 33, in claim 13, delete "quota if" and insert -- quota, if --, therefor.

In column 16, line 12, in claim 16, delete "three- dimensional" and insert -- three-dimensional --, therefor.

Signed and Sealed this

First Day of November, 2011

David J. Kappos
*Director of the United States Patent and Trademark Office*